United States Patent [19]
Buhler et al.

[11] Patent Number: 5,346,659
[45] Date of Patent: Sep. 13, 1994

[54] METHOD FOR PRODUCING A WELD-LINE FREE INJECTION MOLDED PLASTIC CONTAINER BODY PORTION

[75] Inventors: James E. Buhler, Waterford; Scott W. Demarest, Caledonia; Karl J. Bobinger, Union Grove, all of Wis.

[73] Assignee: S. C. Johnson & Son, Inc., Racine, Wis.

[21] Appl. No.: 979,976

[22] Filed: Nov. 23, 1992

[51] Int. Cl.⁵ .................... B29C 45/40; B29C 69/00
[52] U.S. Cl. .................... 264/68; 264/154; 264/155; 264/161; 264/328.11; 264/334; 425/554; 425/577
[58] Field of Search ............ 264/68, 154, 55, 161, 264/163, 328.1, 328.9, 328.11, 334; 425/553, 554, 556, 577, 298, 438, 441, 443, 444

[56] References Cited

U.S. PATENT DOCUMENTS

| | | |
|---|---|---|
| 3,114,594 | 12/1963 | Sherman . |
| 3,570,107 | 3/1971 | Denzler von Matt . |
| 3,820,931 | 6/1974 | Edwards . |
| 4,085,178 | 4/1978 | McNeely et al. ............ 264/161 |
| 4,372,741 | 2/1983 | Cane et al. ............ 264/161 |
| 4,772,196 | 9/1988 | Asai ............ 425/577 |

FOREIGN PATENT DOCUMENTS

| | | |
|---|---|---|
| 0011292 | 3/1985 | European Pat. Off. . |
| 0406011A1 | 1/1991 | European Pat. Off. . |
| 57-191032 | 11/1982 | Japan ............ 425/553 |
| 58-158231 | 9/1983 | Japan ............ 425/554 |
| 1052966 | 12/1966 | United Kingdom . |
| 2098854A | 12/1982 | United Kingdom . |

OTHER PUBLICATIONS

Rosato, Dominick Vo, *Injection Molding Handbook*, 1986, pp. 183–186.

*Primary Examiner*—Jill L. Heitbrink

[57] ABSTRACT

An injection molding mechanism and method of its use for the formation in a single sequence of operations of weld-line free cylindrical container body portions having a central opening at one end. The central opening is formed by the removal of the central top sprue portion of the container body. The container body produced by this mechanism can be used as a pressurizable dispensing container.

5 Claims, 3 Drawing Sheets

METHOD FOR PRODUCING A WELD-LINE FREE INJECTION MOLDED PLASTIC CONTAINER BODY PORTION

TECHNICAL FIELD

This invention relates to the field of injection molding of plastic parts and particularly to a molding mechanism that will first form around a core a weld-line free container body, open at its lower end and closed at its top end, and then remove a central plug from the top end of the container body to form a neck opening before the container body is stripped from the core and the molding mechanism.

BACKGROUND ART

Injection molding of plastic parts is a well known art. When the desired result of the molding process, however, is a strong pressure-resistant container having a top or neck opening of smaller diameter than that of the base, problems can arise. Due to the nature of the molding process, such a container must be molded in more than one part. Then, depending on the relative configurations of the molded parts, either the parts must be joined along seams running the length of the container, or a top portion must be joined to a bottom portion. Any joining of two such plastic parts can produce a weakened area along the join line and the longer the join line relative to the container, the greater the possibility of weakness.

Of all possible methods of joining two or more plastic parts, one of the strongest join-lines is produced by spin-welding. This method, which is in essence heat-welding produced by the friction of two circular rims turning against each other, can obviously only be utilized for or with thermoplastic and cylindrically-joined parts. Plastic parts of other configurations must be joined by other means.

Another type of weak point can result from the design of the molding mechanism itself. When plastic material is injected into a mold cavity at more than one position (through more than one side gate), the plastic material flows from each gate around a molding core. When the separate flows meet, one or more weld-line areas are formed. These areas or lines have different structural characteristics than does the rest of the plastic part. Usually the structural integrity of the part itself is weakest (more inclined to break or rupture) along such weld-lines.

The usual method of forming the body portion for such a container is to allow plastic material to flow around a core, producing a hollow cylindrical structure open at the bottom end and closed at the top end. If a mouth or neck opening into the container is desired, such an opening must then be machined into the non-closed end of the hollow cylindrical structure.

U.S. Pat. No. 1,052,966 to Bloomfield et al., "Pressure Vessels of a Spin-Welded Construction", discloses a container with an open neck, formed in two parts by injection molding and then spin-welded together. No details of the injection molding process or the method by which the neck opening is formed are given. It is assumed that either subsequent machining is necessary or that a side gating technique, which would result in body weld-lines is used. The essence of the invention technique is of spin welding itself as a superior means of bonding thermoplastic parts together.

U.S. Pat. No. 3,820,931 to Edwards, "Injection Mold Producing Open-Mouthed Thin-walled Containers Having Means to Prevent Radical Deflection of the Male Mold Part" discloses an apparatus and process for molding a container that has a single center gate opening into the top portion of the molding cavity. There is no disclosure or suggestion of the possibility of creating a neck opening in the molded container portion by any means.

U.S. Pat. No. 3,570,107 discloses a method for injection molding of a container portion having a lower open end. The essence of this invention is the method of exact sizing of the bottle body by means of a tapering core diameter. No method of removing a top neck sprue area to form an opening is disclosed or suggested: it is only stated that the top area of the bottle will be "subsequently removed," presumably by some form of machining.

SUMMARY DISCLOSURE OF INVENTION

The essence of this invention is the use of a unique molding mechanism which will form, in a single sequence of operations, an injection-molded weld-line free plastic part with a centrally located hole formed therein. The weld-line free character of the part is achieved by the use of a single centrally located sprue channel, which allows the injected plastic material to flow out from the sprue area and over the molding core in an umbrella-like flow to form the body of the plastic with a single flow of plastic material. The in-mold creation of the central hole in the plastic part is achieved by the use of a cooperating combination of a cutting and detaching means (which form the hole by removing the central gating area of the plastic part) and ejection means (to remove the now-formed plastic part from its molding location).

BEST MODE FOR CARRYING OUT THE INVENTION

The preferred embodiment of the present invention is an injection molding mechanism that will form, in a single sequence of operations, a weld-line free container body portion of thermoplastic material having a lower open end and a top neck opening and a method for using this mechanism to produce the container body portion. The container body portion so formed is then preferably spin-welded to a separately formed container bottom portion of corresponding material and a dispensing valve and dip tube assembly is affixed to the neck opening to create a pressurizable plastic container suitable for storing and dispensing an aerosol or other pressurized product.

Figure 1:
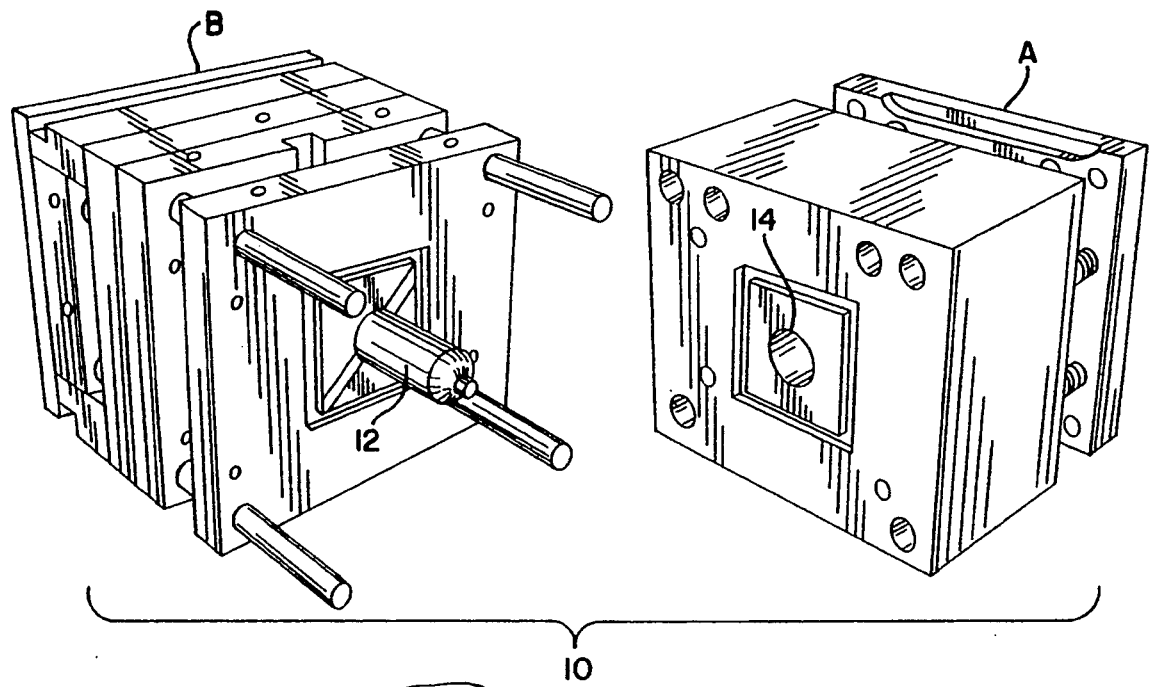
FIG. 1 is a perspective view of the molding mechanism, showing the A and B components in the separated position.

FIG. 1 shows a perspective view (exploded and angled for clarity) of molding mechanism 10, which has two major components—mold component A, as the stationary part of a mold assembly is customarily termed, and mold component B, as the moving part of a mold assembly is customarily termed. These two components are slidably joined by bars, as is well known to those skilled in the art, so such structure is not discussed here. Nor are the conventional and required cooling mechanisms for such molding mechanisms discussed.

Figure 2:
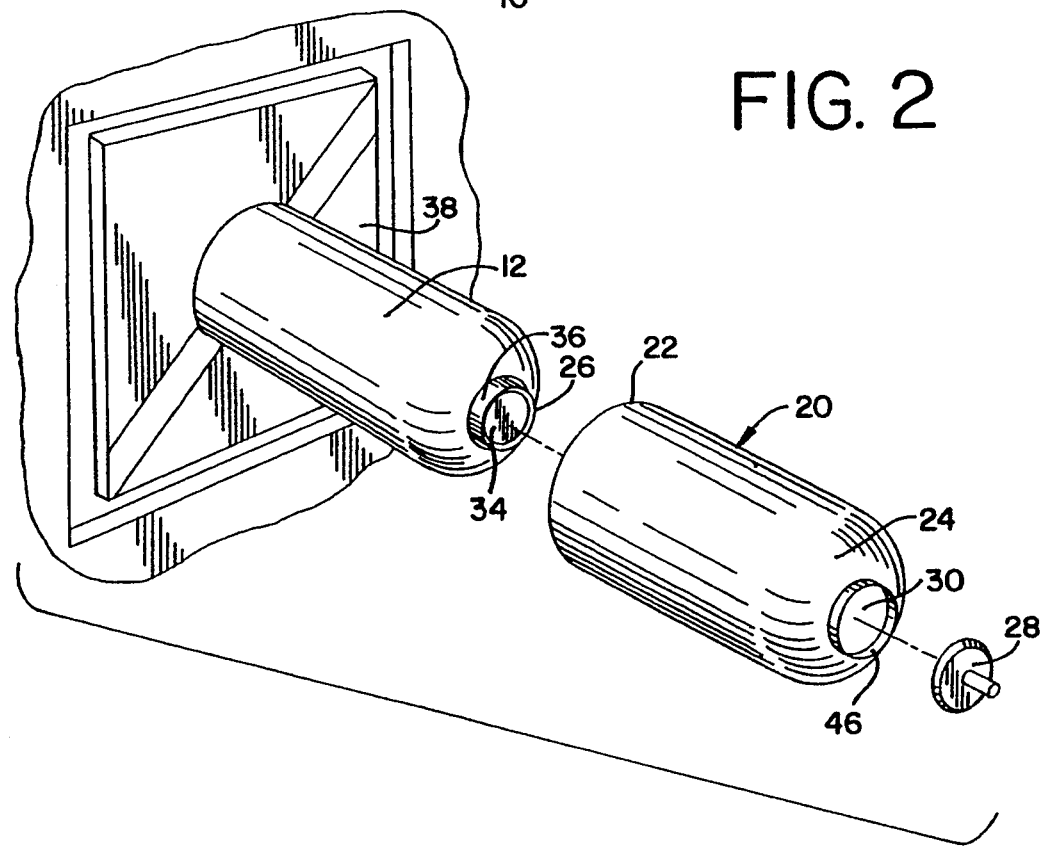
FIG. 2 is an exploded perspective view of the core portion of the molding mechanism, of the container body which is formed thereupon, of the container body portion, and of the central plug detached from the container body.

For clarity, FIG. 2 shows enlarged and exploded and in their appropriate alignment, mold-forming core 12 shown located on mold component B (of which section is shown) and surrounded by stripping plate 38. At the end of molding core 12 is located cutting collar 26 and, visible within cutting collar 26, pin central section 34 visible within cutting collar 26. In front of molding core 12 is container body portion 20, with neck opening 30 which is surrounded by neck opening lip 46. Top sprue portion 28 is shown aligned with neck opening 30.

Figure 3:
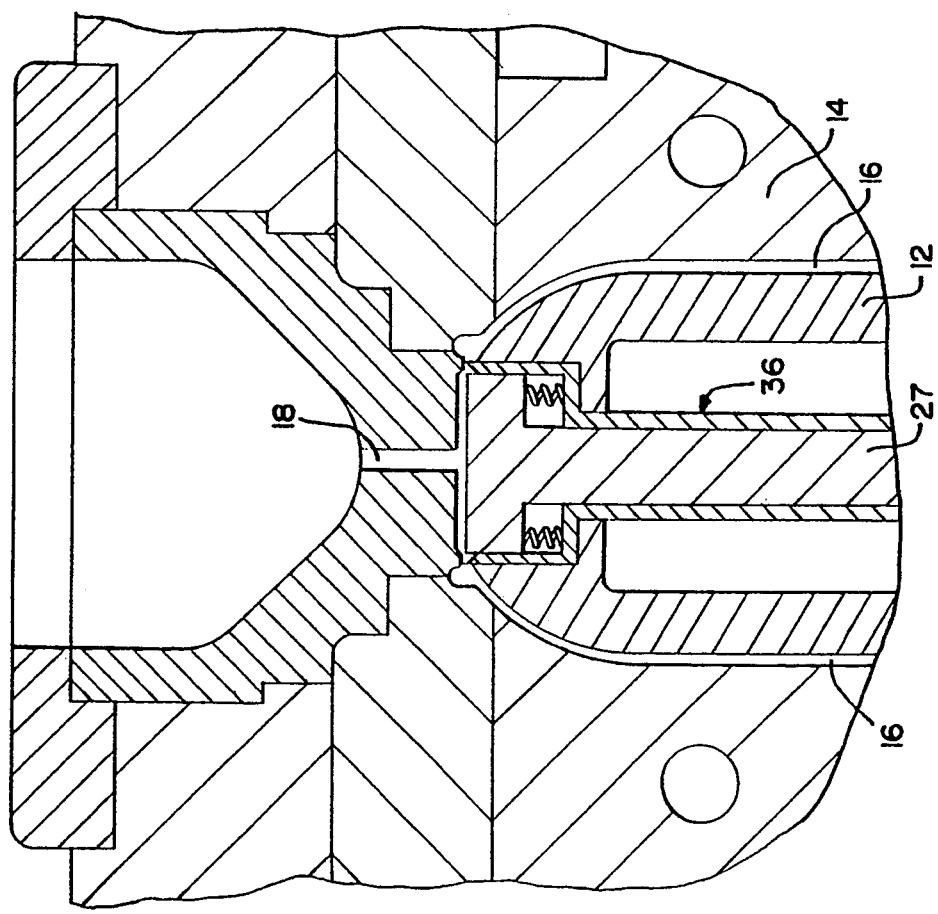
FIG. 3 is a side sectional detail view of the gating mechanism and the molding core, the punch pin, and the cutting collar of the molding mechanism of the present invention.

FIG. 3 is a side sectional view of the mold area of the molding mechanism, showing internal details not visible in the perspective drawings. In this figure, the molding mechanism is shown at the point before the injection of plastic material.

Punch pin 36 has a spring-loaded pin central section Mold-forming core 12 fits into mold-forming cavity 14 in such a way that when mold components A and B are joined, molding space 16 is created. Molding space 16 is so configured that when plastic material is injected through sprue channel 18 into molding space 16, container body portion 20 is created. Container body portion 20 itself has, at the time of molding, an open bottom end 22 and a closed top end 24, as can be seen from FIG. 1.

Figure 4:
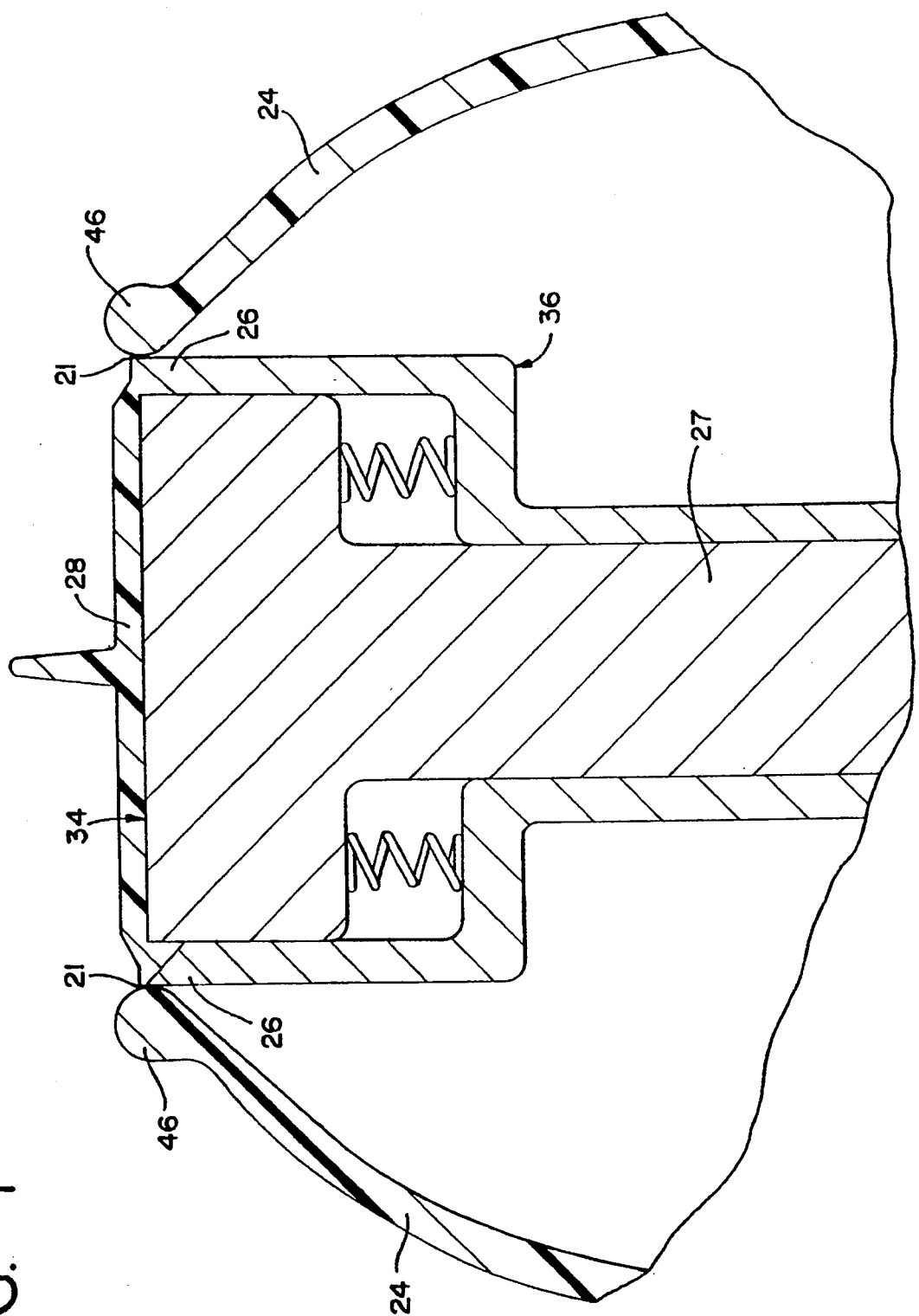
FIG. 4 is a side sectional detail view of the central area of FIG. 3.

FIG. 4 shows a partial enlarged detail of the central area of FIG. 3. This figure shows the central cutting mechanism of molding means 10. Cutting collar 26 is formed on the end of collar stem 27. In FIG. 4, molding space 16 and sprue access channel 18 (which are not shown as defined spaces) have been filled with the injected plastic material to form container body portion 20 (of which only body portion top end 24 is visible) and top sprue portion 28.

As can be noticed in FIGS. 3 and 4, top sprue portion 28 is relatively thinner than is body portion top end 24 (which, as the figures show, has the same thickness as the lower portions of container body 20) of container body 20, especially around sprue connection rim 23. This relative thinness, necessary if top sprue portion 28 is to be removed from body portion top end 24 without structural damage to container body portion 20, can only be achieved by the utilization of centrally located sprue channel 18. Plastic injected through sprue channel 18 flows across the entire top of mold forming core 12 and thence down the sides of mold forming core 12 to form container body portion 20. Only the relatively large surface area over which the injected plastic material may flow after entering molding space 16 makes the relative thinness of the portion of molding space 16 formed above the top of molding core 12 in which is formed top sprue portion 28, possible.

As FIG. 3 shows, sprue channel 18 is a single channel located at the center of mold-forming cavity 14. This umbrella type gate allows injected thermoplastic material to flow into molding space 16 and flow smoothly, in a single sheet flow, down around mold-forming core 12 and forming molded container body portion 20. This single-flow molding technique produces a weld-line free body, since weld-lines which are formed when two or more different flows of plastic materials meet in a mold, are usually the weakest points in the formed piece. Containers made with the molding mechanism, when mold-forming core 12 and thus container body portion 20 is cylindrical (the form exhibiting the highest degree of structural strength) are thus very strong and pressurizable. Other forms of container bodies (e.g. oval or conical) may also be formed using the molding mechanism of the present invention with appropriate design modifications.

After the plastic is injected, mold component B moves away from mold component A. At this point, several motions occur simultaneously. Cutting collar 26 moves forward, while pin central section 34 of punch pin 36 is pushed backward as cutting collar 26 pushes against and severs the connections holding top sprue portion 28 to body portion top end 24.

After top sprue portion 28 is cut loose from formerly closed body portion top end 24 of container body portion cutting collar 26 on collar stem 27 retracts and spring-loaded pin central section 34 of punch pin 36 pushes against now-detached top sprue portion 28 and pops it from its resting position on body portion top end 24. Simultaneously, stripping plate 38 begins to move forward, progressively stripping container body portion 20 off mold-forming core 12. Stripping plate 38 continues to move forward to the end of its stroke, removing container body portion 20 from mold-forming core 12.

This complete removal of the sprue portion of the molded plastic part has several advantages: protruding gating material need not be removed from the part, as it would have to be if it was desirable for aesthetic or functional reasons that no such material remain on the part. There would be two main functional reasons for removal of such material: so that the plastic part would be flat at the former injection point (necessary if the injection point had been the base of a container or a glass, for example) or smooth to allow the close-fitting of an added part (necessary if a valve was to be crimped onto a neck opening, for example).

Container body portion 20 is then stripped off mold-forming core 12 by the action of stripping plate 38. Simultaneously, top sprue portion 28 is detached from container body portion 20 by the pressure of pin central section 34.

Container body portion 20, as discussed above, is far stronger than the average injection molded plastic component. Thus it is highly suited for use as a plastic pressurizable container for the dispensing of aerosols.

Figure 5:
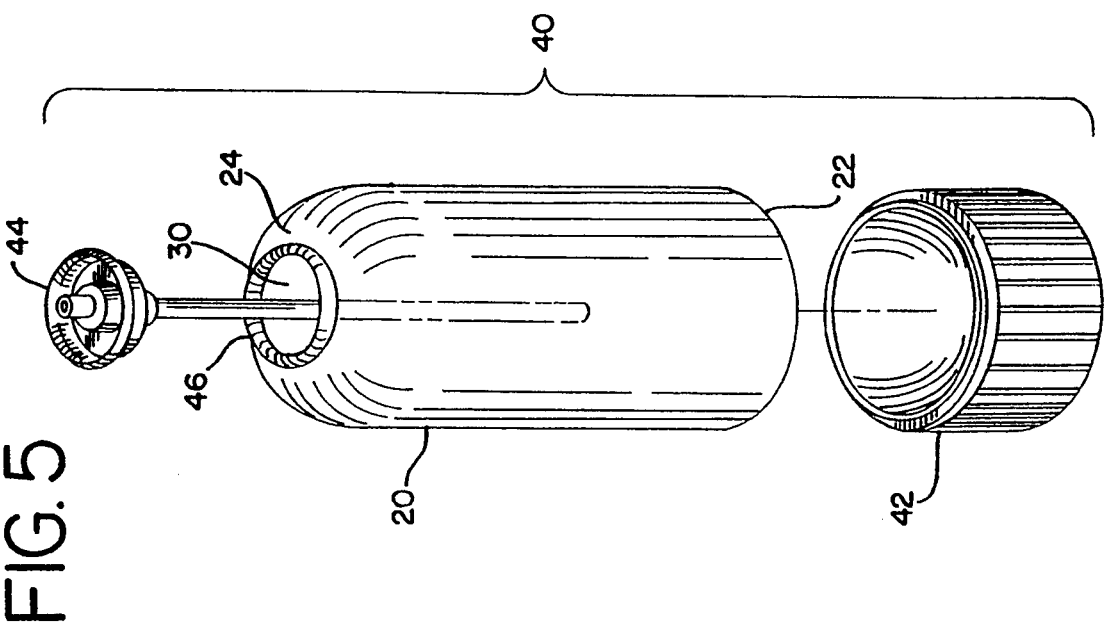
FIG. 5 is an exploded perspective drawing of the pressurizable container of the present invention.

FIG. 5 shows the assembly details of such a pressurizable container 40. Container body portion 20 is joined, preferably by spin welding (although other joining methods such as ultrasonic welding may also be used), to container bottom portion 42, which has been formed in a separate molding operation from the same material of which container body portion 20 has been formed. Dispensing valve and dip tube assembly 44 is then affixed by crimping onto neck opening lip 46 of neck opening 30.

Assembled plastic containers made by this method have proved to have great pressure-resistance. In burst tests of 20 units, containers made from 100% recycled PET had an average burst pressure of 310 psi, while containers made from virgin thermoplastic (Impet 100 from Hoechst Celanese) had an average burst pressure of 355 psi. Most product aerosol cans are designed to withstand pressures on the order of 160 psi.

As will be apparent to one skilled in the art, various modifications can be made within the scope of the aforesaid description. Such modifications which are within the ability of one skilled in the art form a part of the present invention and are embraced by the claims. Examples of such modifications would be the formation of a plastic part having, in addition to the central gating hole produced by this molding mechanism, additional holes formed toward the top of the part to form a grill or similar structure to allow the escape of vapors from the part. It is also possible that a molding mechanism could be designed that had the injected plastic entering the molding space through the mold forming core rather than from the top of the molding cavity. It would also be possible to configure the top portion of the molding cavity so that the top sprue portion has a series of relatively wide flow areas rather than the entire molding space being open to the flow of plastic.

INDUSTRIAL APPLICABILITY

Since the essence of this invention is a mechanism and method by which in one sequence of operations a plastic part may be molded from injected plastic material and then a central opening created toward one end of that plastic part, any number of types of parts, including but not limited to containers may be produced according to the teachings of this invention. A preferred embodiment of the invention is the production of pressurizable plastic containers. Such containers are suitable for the dispensing of substances such as gels, which require relatively lower pressures, and aerosols requiring higher pressurization such as hair spray, insecticidal formulations, and the like.

What I claim is:

1. A method of forming, from injected plastic material, a weld-line free container body portion having at a first end a neck opening of a smaller diameter than the diameter of the container body portion and at a second end an opening substantially equal to the diameter of the container body portion, the method comprising the steps of:

providing a molding mechanism having an A mold component which has formed therein a mold-forming cavity and gating means to allow injected plastic material to reach that cavity, and a B mold component having protruding therefrom a mold-forming core, the A and B mold components, when fitted together, being configured to form the container body portion within the space existing between the core and the cavity, the A and B mold components further being designed to be separated after the formation of the container body portion, the molding mechanism having, slideably located within the mold forming core, means for forming the neck opening in the closed end of the container body portion and having movably located within the B component, means for stripping the formed container body portion from the mold forming core, the means for forming the neck opening in the closed end of the container body portion comprising an independently moveable cutting collar for cutting the neck opening, and the cutting collar surrounding a punch pin for ejecting the cut section of the container body portion to form the neck opening, the punch pin being centrally and slideably located in the center of the mold-forming core;

applying pressure on the B mold component so that the B mold component is forced against the A mold component, then injecting, through the gating means in the A mold component, a plastic material into the space existing between the molding core and the molding cavity so that the container body portion having one end closed is formed therebetween, then applying force to the B mold component so that the B mold component moves away from the A mold component, then applying force to the cutting collar and punch pin so that a neck opening is first cut and then opened in the previously closed end of the container body portion, and then applying power to the means for stripping so that the formed container body portion is stripped from its position on the molding core.

2. A method of forming a weld-line free container body portion according to claim 1 wherein the means for stripping the formed container body portion is a stripping plate located at the base of and surrounding the mold forming core on the B mold component and moveable relative to that mold forming core.

3. A method of forming a weld-line free container body portion according to claim 1 wherein the gating means comprises a sprue channel opening into the end of the molding cavity in such a manner that when mold components A and B are fitted together thermoplastic material injected into the A mold component flows down into the space created between the molding cavity and the forming core of mold component B to form, from the injected thermoplastic material, the weld-line free container body portion.

4. A method of forming a pressurizable plastic dispensing container, the pressurizable plastic dispensing container being formed from a cylindrical container body portion having at one end a centrally located neck aperture which is surrounded by a raised neck lip structure and a container bottom portion, the cylindrical container body portion and the container bottom portion being joined to form the pressurizable plastic dispensing container, the method comprising the steps of:

providing a molding mechanism having an A mold component, which has formed therein a mold-forming cavity and centrally located gating means to allow injected thermoplastic material to reach that cavity, and a B mold component, having protruding therefrom a mold-forming core, the A and B mold components, when fitted together, being configured to form a cylindrical container body portion within the space existing between the core and the cavity, the a and B mold components being designed to be separated after the formation of the cylindrical container body portion, the molding mechanism further having, slideably located within the mold forming core, means for forming a neck opening in the closed end of the container body portion and having a stripping plate located at the base of and surrounding the mold-forming core on the B mold component and moveable relative to that mold-forming core, the means for forming the neck opening in the closed end of the container body portion comprising an independently moveable cutting collar for cutting the neck opening, and the cutting collar surrounding a punch pin for ejecting the cut section of the container body portion to form the neck opening, the punch pin being centrally and slideably located in the center of the mold-forming core, applying pressure on the B mold component so that the B mold component is forced against the A mold component, then injecting, through the gating means in the A mold component, a thermoplastic material into the space existing between the molding core and the molding cavity so that the container body portion having a neck lip structure encircling a closed end of the container body is formed therebetween, then applying force to the B mold component so that the B mold component moves away from a A mold component, then applying force to the cutting collar and punch pin so that a neck opening is first cut and then opened in the previously closed end of the container body portion, then applying power to the stripping plate so that the formed container body portion is stripped from its position on the molding core, forming, from thermoplastic material, in a separate molding operation, a container bottom portion, then joining the container body portion and the container bottom portion, and affixing to the neck lip structure encircling the neck opening a dispensing valve and dip tube assembly to form the assembled pressurizable container.

5. A method of forming a pressurizable plastic dispensing container according to claim 4 wherein the joining is spin-welding.

* * * * *

UNITED STATES PATENT AND TRADEMARK OFFICE
CERTIFICATE OF CORRECTION

PATENT NO. : 5,346,659

DATED : September 13, 1994

INVENTOR(S) : James E. Buhler, Scott W. Demarest & Karl J. Bobinger

It is certified that error appears in the above-identified patent and that said Letters Patent is hereby corrected as shown below:

Column 6, line 59, "a" should be --A--.

Signed and Sealed this

Eighteenth Day of April, 1995

Attest:

BRUCE LEHMAN

Attesting Officer
Commissioner of Patents and Trademarks